United States Patent
Stamps et al.

(10) Patent No.: US 8,257,051 B2
(45) Date of Patent: Sep. 4, 2012

(54) STIFF-IN-PLANE GIMBALED TILTROTOR HUB

(75) Inventors: Frank B. Stamps, Colleyville, TX (US); Richard E. Rauber, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 1073 days.

(21) Appl. No.: 12/159,007

(22) PCT Filed: Jan. 13, 2006

(86) PCT No.: PCT/US2006/001082
§ 371 (c)(1),
(2), (4) Date: Jun. 24, 2008

(87) PCT Pub. No.: WO2007/081337
PCT Pub. Date: Jul. 19, 2007

(65) Prior Publication Data
US 2008/0292468 A1 Nov. 27, 2008

(51) Int. Cl.
*B64C 27/32* (2006.01)
(52) U.S. Cl. ............... 416/244 R; 416/134 A; 416/141; 416/148
(58) Field of Classification Search ........... 416/134 A, 416/141, 148, 244 R
See application file for complete search history.

(56) References Cited

U.S. PATENT DOCUMENTS

| | | | |
|---|---|---|---|
| 2,633,925 A | 4/1953 | Bates | |
| 4,231,705 A | 11/1980 | Watson | |
| 4,323,332 A * | 4/1982 | Fradenburgh | 416/134 A |
| 4,580,945 A | 4/1986 | Miller | |
| 4,804,352 A * | 2/1989 | Schmidt | 464/17 |
| 5,165,853 A * | 11/1992 | Pancotti | 416/134 A |
| 5,478,204 A * | 12/1995 | Desjardins et al. | 416/168 R |
| 5,620,305 A * | 4/1997 | McArdle | 416/134 A |
| 6,296,444 B1 * | 10/2001 | Schellhase et al. | 416/134 A |
| 6,981,844 B2 * | 1/2006 | Perkinson et al. | 416/1 |
| 7,153,094 B2 | 12/2006 | Sehgal et al. | |
| 2003/0222171 A1 | 12/2003 | Zoppitelli et al. | |

FOREIGN PATENT DOCUMENTS

| | | |
|---|---|---|
| EP | 1348623 A1 | 9/2011 |
| JP | 54093598 A | 7/1979 |
| JP | 61021894 A | 1/1986 |

(Continued)

OTHER PUBLICATIONS

European Office Action in European Counterpart Application No. 06849210.7, issued by European Patent Office, dated May 4, 2011, 7 pages.

(Continued)

*Primary Examiner* — Jerome Jackson, Jr.
*Assistant Examiner* — David Spalla
(74) *Attorney, Agent, or Firm* — James E. Walton; Jeffrey O. Williams (57) ABSTRACT

A rotor-hub for a rotary-wing aircraft is disclosed. The rotor-hub comprises a yoke comprising a plurality of yoke arms and a plurality of yoke straps, wherein the yoke arms are joined together by the yoke straps, and wherein a plurality of inner walls of the yoke define a central void space. A pitch horn is movably connected to the yoke and a portion of the pitch horn is located within the central void space. A connecting shell is fixedly attached to the yoke.

10 Claims, 11 Drawing Sheets

FOREIGN PATENT DOCUMENTS

JP        2001130494 A    1/1986

OTHER PUBLICATIONS

International Search Report and Written Opinion in PCT Application No. PCT/US06/01082, issued by the U.S. International Search Authority, dated Jul. 7, 2008, 6 pages.
Canadian Examination Report in Canadian Counterpart Application No. 2,635,672, issued by Canadian Intellectual Property Office, dated Jun. 8, 2011, 2 pages.
Chinese First Office Action in Chinese counterpart application No. 200680050896.8, issued by Chinese Patent Office, dated Mar. 29, 2011.
Japanese Office Action in Japanese counterpart application No. 2008-550277, issued by Japanese Patent Office, May 26, 2011, four (4) pages.
Second Office Action in CN counterpart Application No. 200680050896.8, issued by the Patent Office of China on Apr. 6, 2012.

* cited by examiner

STIFF-IN-PLANE GIMBALED TILTROTOR HUB

TECHNICAL FIELD

The present invention relates to the field of rotary-wing aircraft rotor-hubs. In particular, the present invention relates to a stiff-in-plane, gimbaled tiltrotor hub.

DESCRIPTION OF THE PRIOR ART

Rotor-hubs have been in use for many years. There are numerous successful designs of rotor-hubs for various types of rotary-wing aircraft. Rotor-hubs are typically designed for, and therefore particularly well suited as, a means of connecting rotor-blades to a rotating shaft or mast.

It is common for those of ordinary skill in the art of rotary-wing aircraft design to classify rotor-hubs into two major categories, "stiff-in-plane" and "soft-in-plane." A stiff-in-plane rotor-hub is used in rotary-wing aircraft wherein the natural frequency of in-plane/lead-lag vibration of the rotor-blades is higher than both the rotor rotational frequency and the natural frequency of out-of-plane/flapping vibration of the rotor-blades. A soft-in-plane rotor-hub is used where the natural frequency of in-plane/lead-lag vibration of the rotor-blades is lower than both the rotor rotational frequency and the natural frequency of out-of-plane/flapping vibration of the rotor blades. It is well known that the rotor-blades and associated rotor-hub of a rotary-wing aircraft become more dynamically unstable as the natural frequencies of out-of-plane/flapping vibration of the rotor-blades and in-plane/lead-lag vibration of the rotor-blades converge toward equal values. Accordingly, it is not uncommon for a rotary-wing aircraft to be designed such that the natural frequencies of out-of-plane/flapping vibration of the rotor-blades and in-plane/lead-lag vibration of the rotor-blades maintain a minimum separation of about 25% of the rotor rotational frequency.

In choosing between stiff-in-plane and soft-in-plane systems, several high level generalizations are often considered while designing a rotary-wing aircraft. The combined weight of the rotor-hub and rotor-blades of a stiff-in-plane, rotary-wing aircraft are typically heavier than the combined weight of the rotor-hub and rotor-blades of a soft-in-plane, rotary-wing aircraft. However, stiff-in-plane componentry is currently thought to be a better solution for traveling at higher speeds and/or producing greater thrust, while more readily maintaining dynamic vibratory stability.

Figure 1:
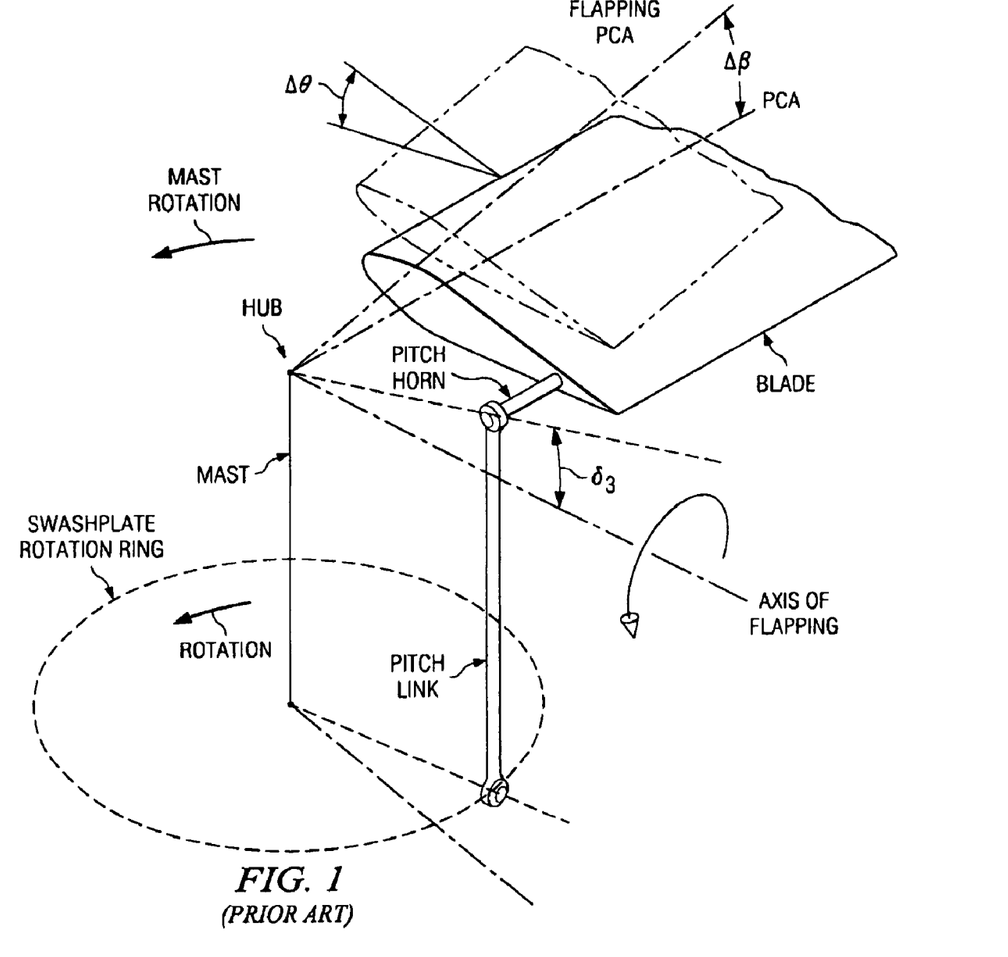
FIG. 1 is a simplified schematic representation of the effect of $\delta_3$ angle in a rotor system.

One of the numerous variables in achieving desired dynamic vibratory stability of the rotor-hub and rotor-blades of a stiff-in-plane rotary-wing craft is the $\delta_3$ angle. Prior Art FIG. 1 shows a schematic of a rotor-hub which illustrates the $\delta_3$ angle in relation to a rotor system. Because one end of the pitch horn is restrained by the pitch link and the other end of the pitch horn is attached to the blade, a pitch change will occur as the blade flaps. Hence, the $\delta_3$ angle represents a correlation between the rotor flapping and rotor-blade pitch. As the rotor-blade flaps upward, a rotor system with a positive $\delta_3$ angle will experience a nose-down pitch, while a rotor system with a negative $\delta_3$ angle will experience a nose-up pitch. The $\delta_3$ angle is manipulated to provide dynamic stability as well as to reduce rotor flapping amplitudes during gust disturbances and/or pilot maneuvers. As an example, the $\delta_3$ angle on a three-bladed, tilt-rotor aircraft is typically set to values near −15 degrees, which provides an adequate level of stability and flapping attenuation.

Demand is increasing for rotary-wing aircraft to achieve more thrust, higher speeds, and carry heavier loads. For example, there is a demand for more powerful tilt-rotor aircraft. One way of producing more thrust is to increase the number of rotor-blades. Current tilt-rotor aircraft typically utilize three-bladed rotor systems. In three-bladed rotor systems, the pitch horn and pitch link (see Prior Art FIG. 1) are usually located generally in-plane with the rotor-hub and outside of the rotor-hub. However, achieving small $\delta_3$ angles (e.g., $\delta_3$ angles near −15 degrees) for a multi-bladed rotor having four or more blades, while locating the pitch horn and pitch link generally in-plane with the hub and outside of the hub, presents a serious design challenge. The rotor-hub configuration, as described above for multi-bladed rotor systems, does not allow the pitch horns to be located at the proper positions due to structural interferences. Further, it is widely accepted as desirable by those of ordinary skill in the art of rotary-wing aircraft design to configure rotating componentry of rotor systems to remain as close to the axis of rotation as possible to minimize undesirable resultant forces that lead to early component failure.

While the above described rotor-hub advancements represent significant developments in rotor-hub design, considerable shortcomings remain.

SUMMARY OF THE INVENTION

There is a need for an improved rotor-hub.

Therefore, it is an object of the present invention to provide an improved rotor-hub which allows connection to four or more rotor-blades while maintaining optimal $\delta_3$ angles.

This object is achieved by providing a rotor-hub in which both the pitch links and pitch horns are located within an interior void of the rotor-hub. For example, the rotor-hub may be configured: (1) with a connecting shell located above the yoke; (2) with a connecting shell located below the yoke; and (3) with two connecting shells, one connecting shell being located above the yoke and one connecting shell being located below the yoke.

The present invention provides significant advantages, including: (1) allowing the use of more than three blades in a rotor system of a tilt-rotor aircraft; (2) reducing opportunity for pitch horn damage due to debris or ballistic attack; (3) reducing opportunity for drive link damage due to debris or ballistic attack; (4) offering hub-spring redundancy; and (5) improving force transfer between hub-springs and the yoke.

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

Prior Art

DESCRIPTION OF THE PREFERRED EMBODIMENT

The present invention is an improved rotor-hub which allows connection to four or more rotor-blades while maintaining optimal $\delta_3$ angles. There are three main embodiments of the invention: (1) with a connecting shell located above the yoke; (2) with a connecting shell located below the yoke; and (3) with two connecting shells, one connecting shell located above the yoke and one connecting shell located below the yoke. The scope of the present invention, however, is not limited to the particular embodiments disclosed herein and depicted in the drawings. The rotor-hub of the present invention allows for the incorporation of four-bladed rotor systems on tilt-rotor rotary-wing aircraft. However, while specific reference is made to using the present invention with tilt-rotor rotary-wing aircraft, the present invention may alternatively be used with any other rotary-wing vehicle/craft. Further, the rotor-hub of the present invention may alternatively be used with rotary system having more or fewer than four rotor-blades.

Figure 2:
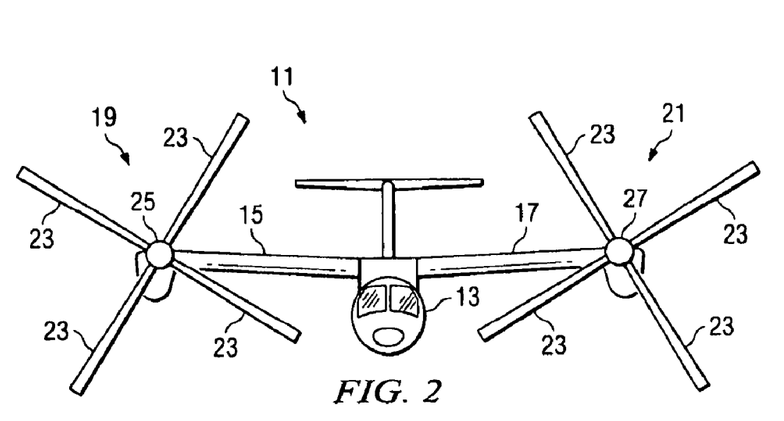
FIG. 2 is an elevational view of a tilt-rotor aircraft having a rotor-hub according to the preferred embodiment of the present invention.

FIG. 2 depicts a tilt-rotor, rotary-wing aircraft incorporating a rotor-hub of the present invention. FIG. 2 illustrates a tilt-rotor aircraft 11 in an airplane mode of flight operation. Wings 15, 17 are utilized to lift craft body 13 in response to the action of rotor systems 19, 21. Each rotor system 19, 21 is illustrated as having four rotor-blades 23. Nacelles 25, 27 substantially enclose rotor-hubs 29, obscuring rotor-hubs 29 from view in FIG. 2. Of course, each rotor system 19, 21 is driven by an engine (not shown) substantially housed within each nacelle 25, 27, respectively.

Figure 3A:
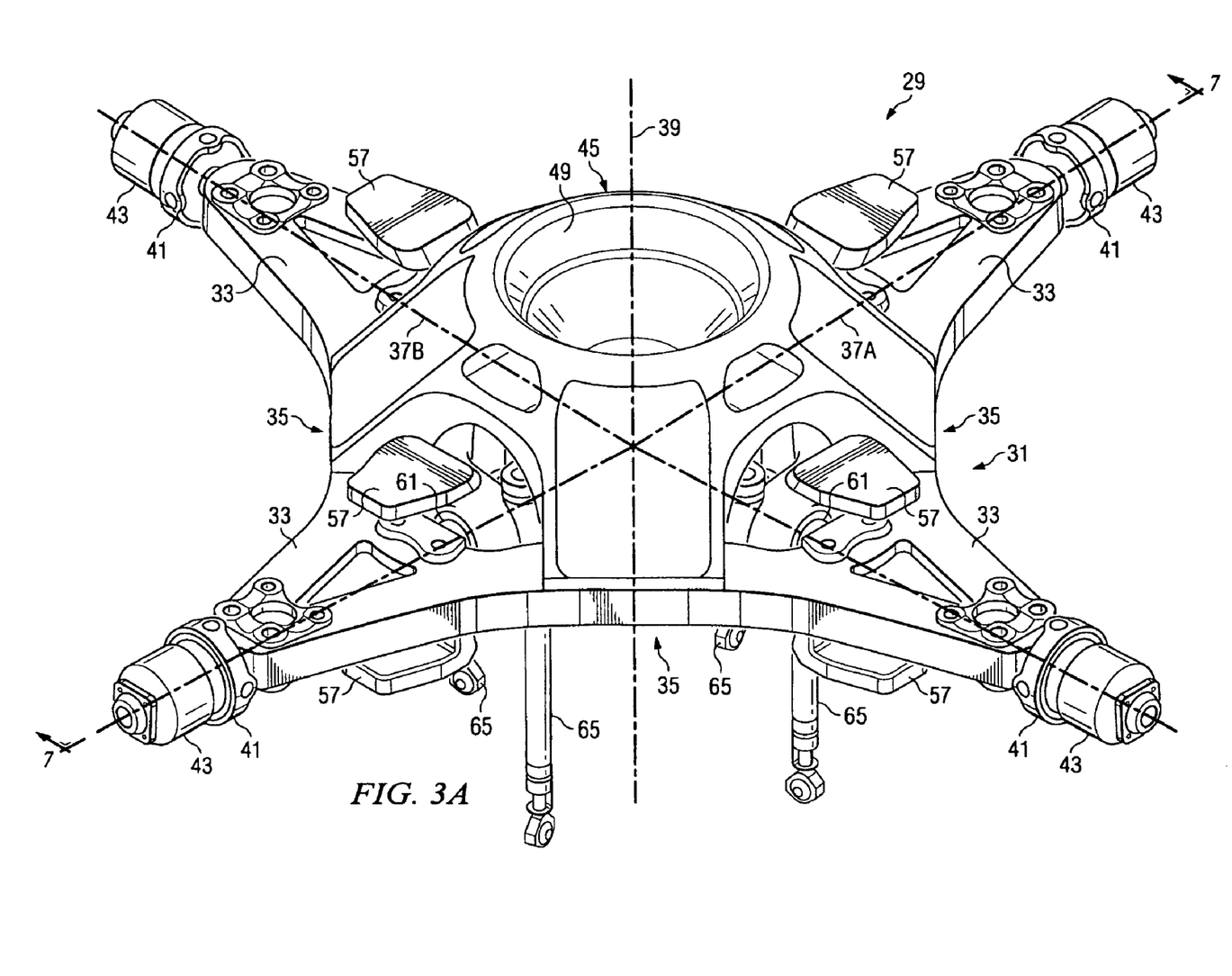
FIG. 3A is a perspective view of the rotor-hub used in the tilt-rotor aircraft of FIG. 2.

FIG. 3A illustrates a perspective view of the preferred embodiment of the rotor-hub 29 of the present invention. Rotor-hub 29 is illustrated as comprising a yoke 31 having yoke arms 33 and yoke straps 35. Yoke arms 33 are integrally connected to yoke straps 35. In one embodiment, yoke 31 is constructed of composite materials. More specifically, yoke 31 is constructed of a multiplicity of discrete bonded layers of directional fiber material. However, yoke 31 may alternatively be constructed of any other suitable material in any other suitable fashion. Further, while yoke 31 is illustrated as having four yoke arms 33, other rotor-hub configurations according to the present invention may comprise more or fewer than four yoke arms 33 for connection with more or fewer than four rotor-blades 23, respectively.

Rotor-hub 29 is further illustrated with representative pitch change axes 37A, 37B, about which the pitch of rotor-blades 23 (see FIG. 2) is altered. Additionally, rotor-hub 29 is illustrated with a representative mast rotation axis 39, about which a mast (not shown) is rotated when driven by an operably associated transmission (not shown).

Outboard feathering bearings 41 are attached to the outermost portions of yoke arms 33. Outboard feathering bearings 41 allow at least some degree of rotation of rotor-blades 23 about pitch change axes 37A, 37B. Centrifugal force (CF) bearings 43 are attached to outboard feathering bearings 41. CF bearings 43 are the primary intermediary connective devices between rotor-blades 23 and rotor-hub 29. CF bearings 43 withstand the often enormous centrifugal force generated by rotating rotor-blades 23 about mast rotation axis 39.

Figure 3B:
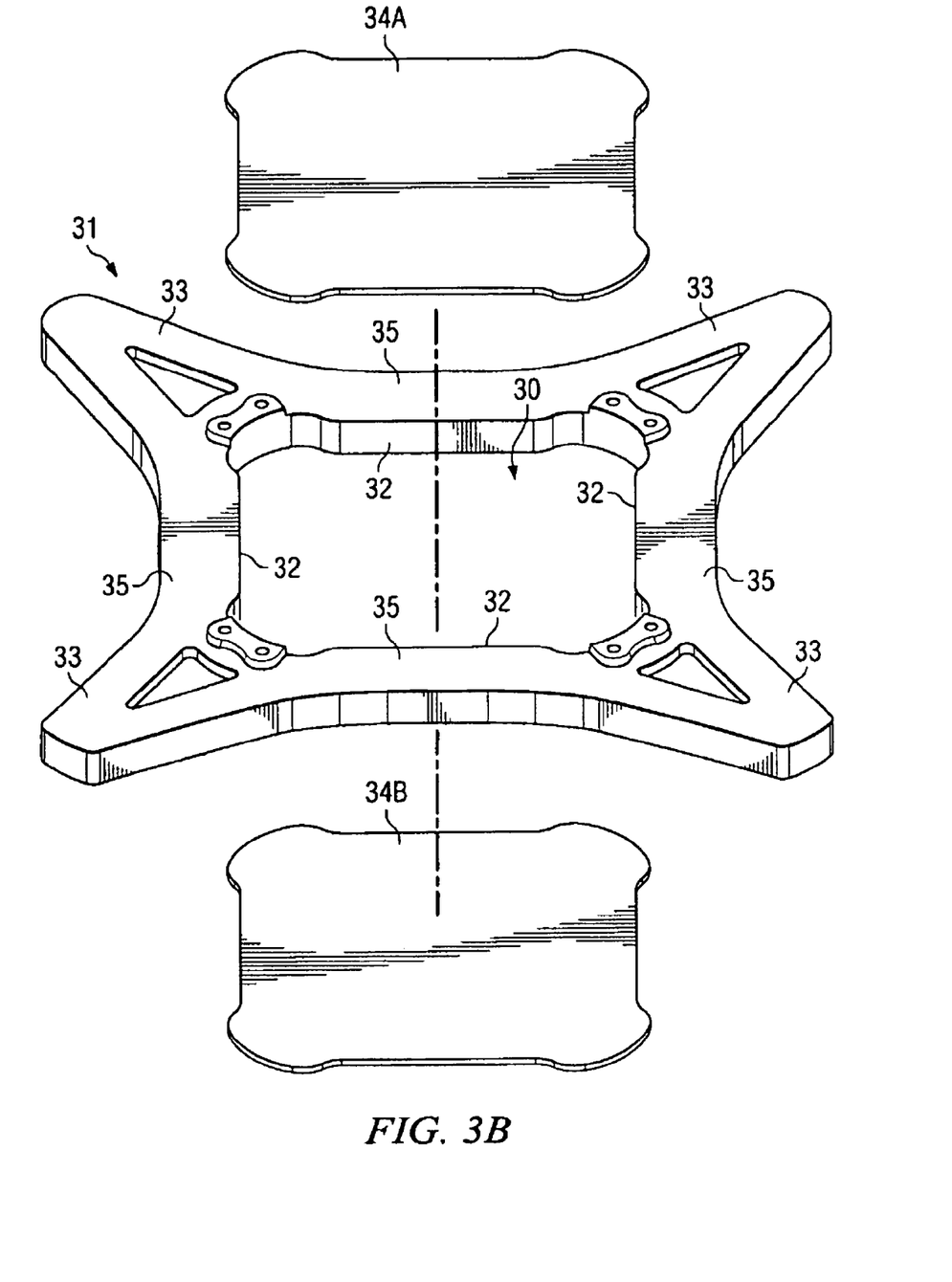
FIG. 3B is a perspective view of the yoke of the rotor-hub of FIG. 3A.

FIG. 3B illustrates a simplified view of yoke 31 of rotor-hub 29. A central void space 30 is defined by inner walls 32 of yoke 31.

Figure 7:
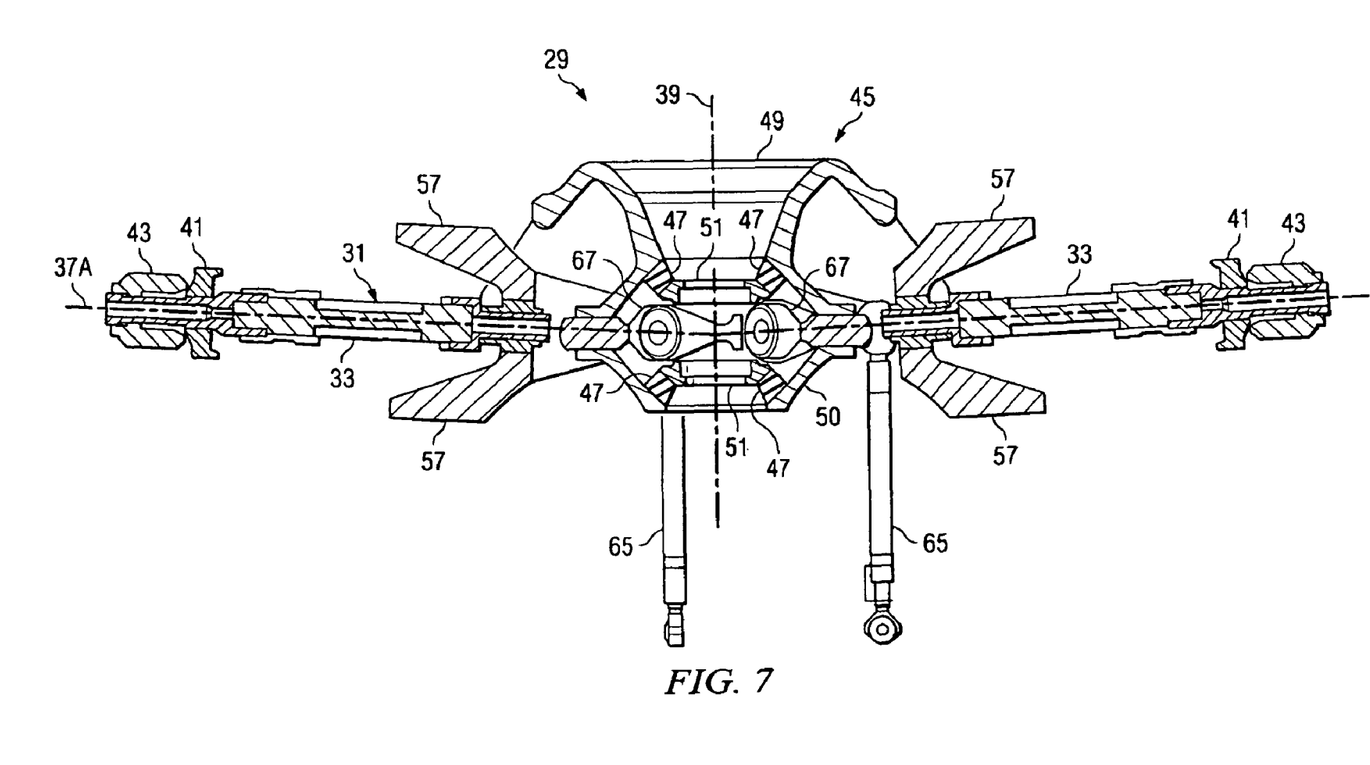
FIG. 7 is cross-sectional view of the rotor-hub of FIG. 3A taken along the line 7-7 in FIG. 3A.

As illustrated in FIG. 7, hub-spring 45 includes an inner-core 47 comprising a first series of various alternatingly stacked rubber elements and metal shim elements (neither shown in detail) sandwiched between an upper, outer connecting shell 49 and an inner shell 51 and a second series of various alternatingly stacked rubber elements and metal shim elements sandwiched between a lower, outer shell 50 and another inner shell 51. Shells 49-51 are illustrated as being constructed of metal. Hub-spring 45 allows gimbaling of yoke 31 with respect to the mast and mast rotation axis 39. Hub-spring 45 also accommodates flapping of rotor-blades 23 and transfers thrust.

Figure 4:
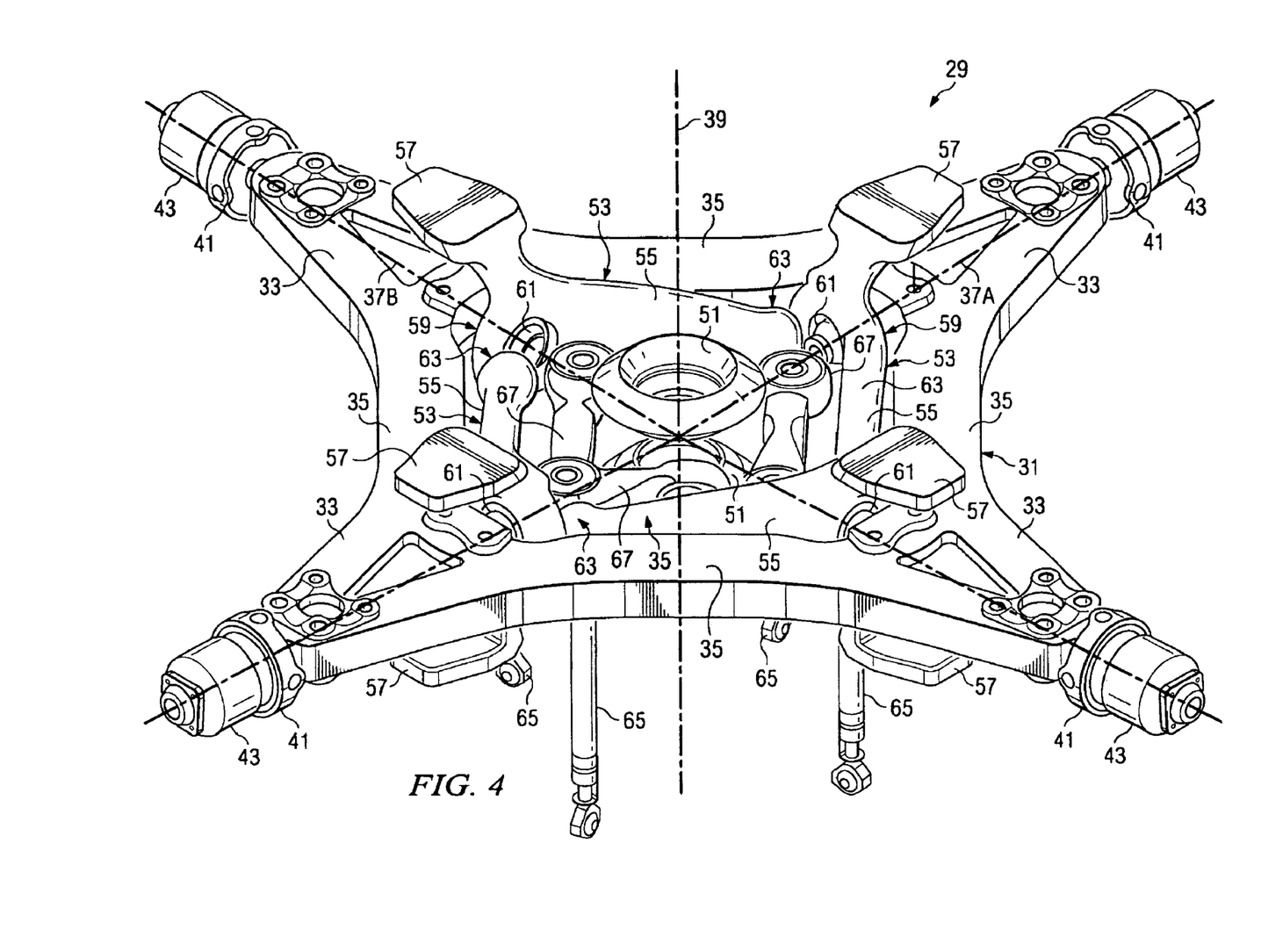
FIG. 4 is a perspective view of the rotor-hub of FIG. 3A with the connecting shell removed.

As can more clearly be seen in FIG. 4, wherein rotor-hub 29 is illustrated without connecting shell 49, rotor-hub 29 further comprises four pitch horns 53. Pitch horns 53 comprise pitch horn arms 55 and pitch horn inboard beams 57. Pitch horns 53 are rotatably connected to crotches 59 through inboard feathering bearings 61. Inboard feathering bearings 61 are substantially centered along corresponding pitch change axes 37A, 37B. Inboard feathering bearings 61 are operably associated with like-sized apertures in pitch horns 53 located substantially at the intersection of pitch horn arms 55 and pitch horn inboard beams 57. Grips (not shown) are connected to pitch horn inboard beams 57 such that, when pitch horns 53 are rotated about their corresponding pitch change axes 37A, 37B, grips cause rotor-blades 23 (shown in FIG. 2), which are attached to grips, to correspondingly rotate about the pitch change axes 37A, 37B. Ends 63 of pitch horns 53 are illustrated as being located in a neutral/nominal position when ends 63 are substantially centered about the plane created by pitch change axes 37A, 37B. Ends 63 of pitch horns 53 are connected to upper ends of pitch links 65. Pitch links 65 are rod-like elements oriented substantially parallel to mast rotation axis 39. Movement of pitch links 65 in either direction along a path parallel to mast rotation axis 39 will either raise or lower ends 63, thereby rotating pitch horn arms 55 and pitch horn inboard beams 57 about their pitch change axes 37A, 37B, ultimately changing the pitch of rotor-blades 23. Pitch horns 53 are located substantially within central void space 30. A central void column is defined by extending the vertical boundaries of central void space 30 both upward and downward and represents the vertical footprint of central void space 30. For example, the central void column occupies at least the space between upper footprint 34A and lower footprint 34B as illustrated in FIG. 3B. In this embodiment, arms 55 extend outside of the central void column. However, in other embodiments of the present invention, arms 55 may alternatively remain within the central void column.

Figure 5:
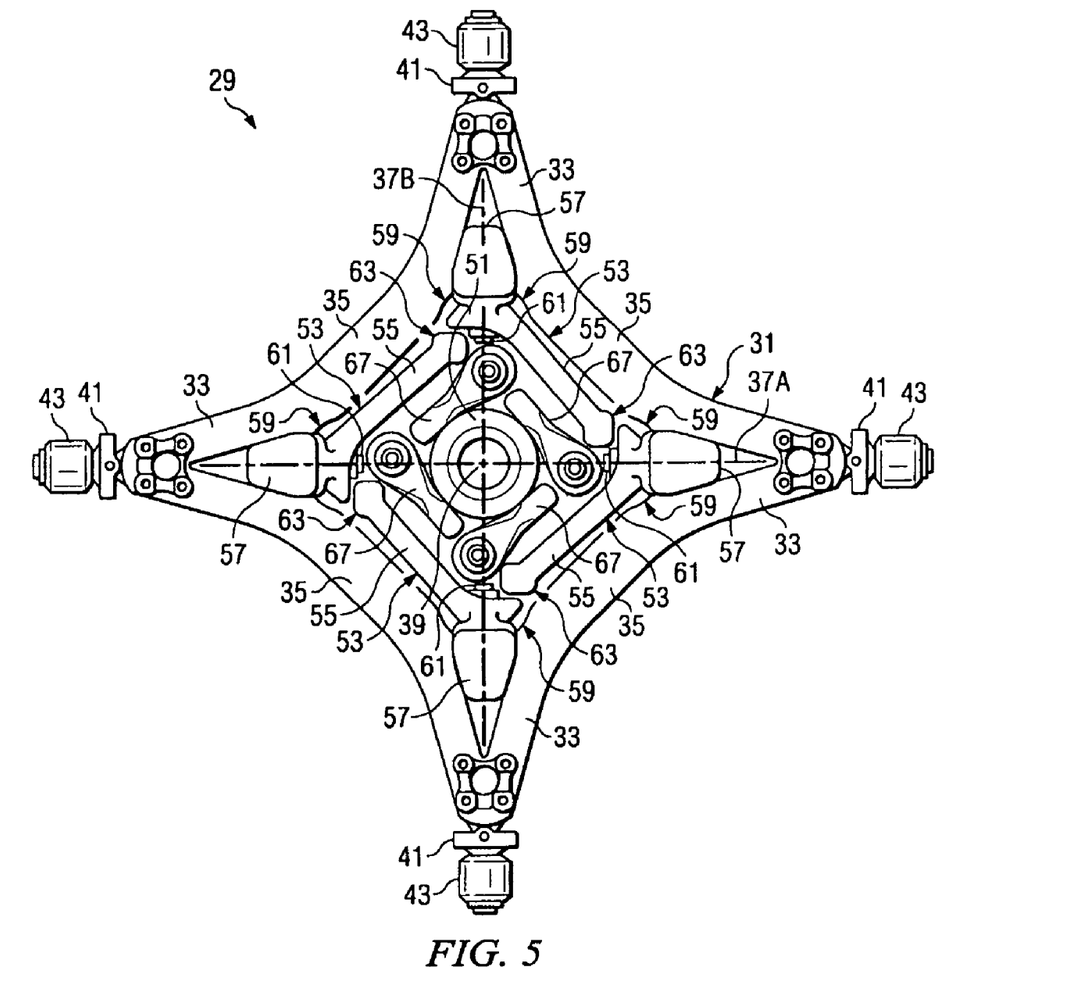
FIG. 5 is a top view of the rotor-hub of FIG. 3A with the connecting shell removed.
Figure 6:
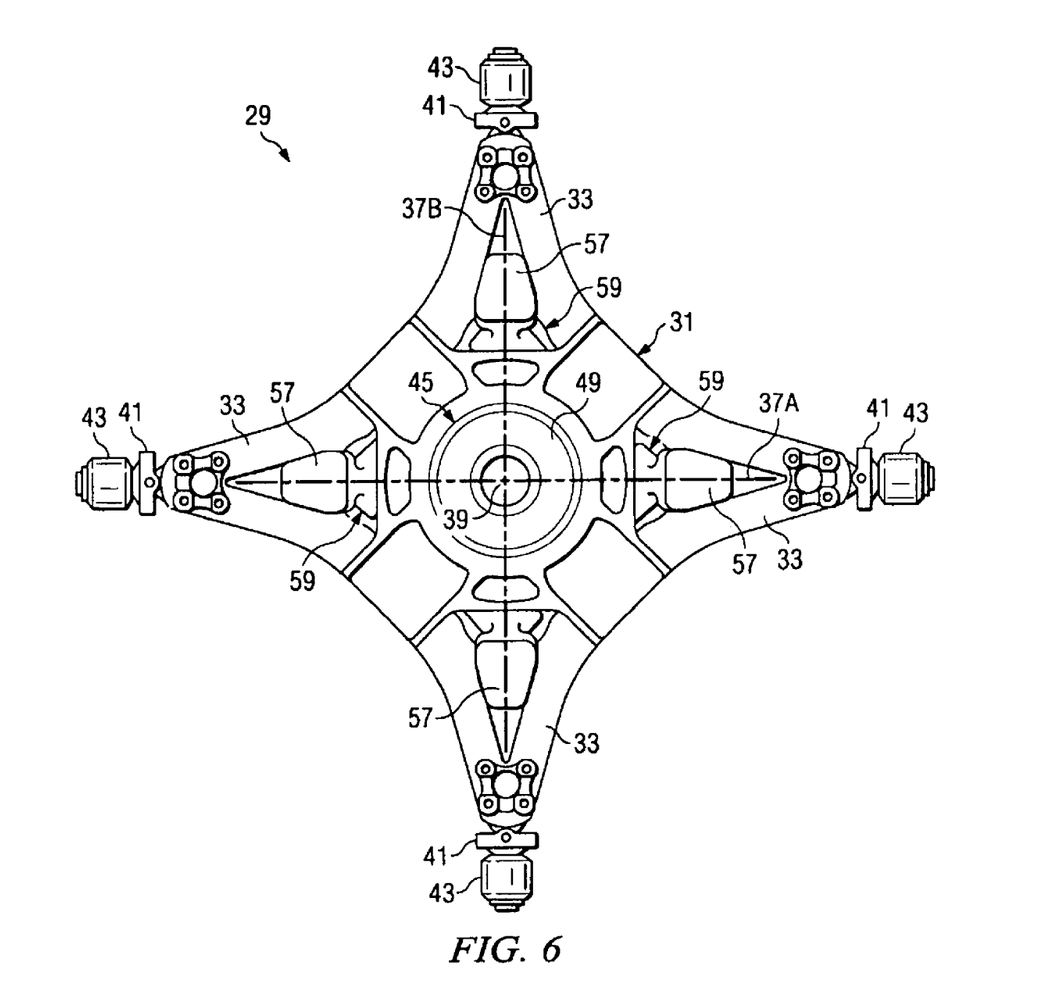
FIG. 6 is a top view of the rotor-hub of FIG. 3A.

As can more clearly be seen in FIG. 5, wherein a top view of rotor-hub 29 is illustrated without connecting shell 49 and lower, outer shell 50, rotor-hub 29 further comprises a constant velocity/homokinetic joint (not fully shown) which comprises drive links 67. Drive links 67 are oriented substantially parallel to the plane created by pitch change axes 37A, 37B. One end of each drive link 67 is adapted for connection to a trunnion (not shown) splined to the mast/drive shaft (not shown). The trunnion transfers rotational force from the mast to drive links 67. The other end of each drive link 67 is adapted for attachment to drive legs 68 of connecting shell 49 (see FIGS. 10 and 11) which transfers the rotational force from drive links 67 to connecting shell 49. Connecting shell 49 is connected to yoke 31 along yoke straps 35 such that rotational force is transferred from connecting shell 49 to yoke 31. FIG. 6 illustrates a top view of rotor-hub 29, while FIG. 7 illustrates a cross-sectional view of rotor-hub 29 taken along a line 7-7 of FIG. 3A corresponding to the pitch change axis 37A, 37B.

Figure 8:
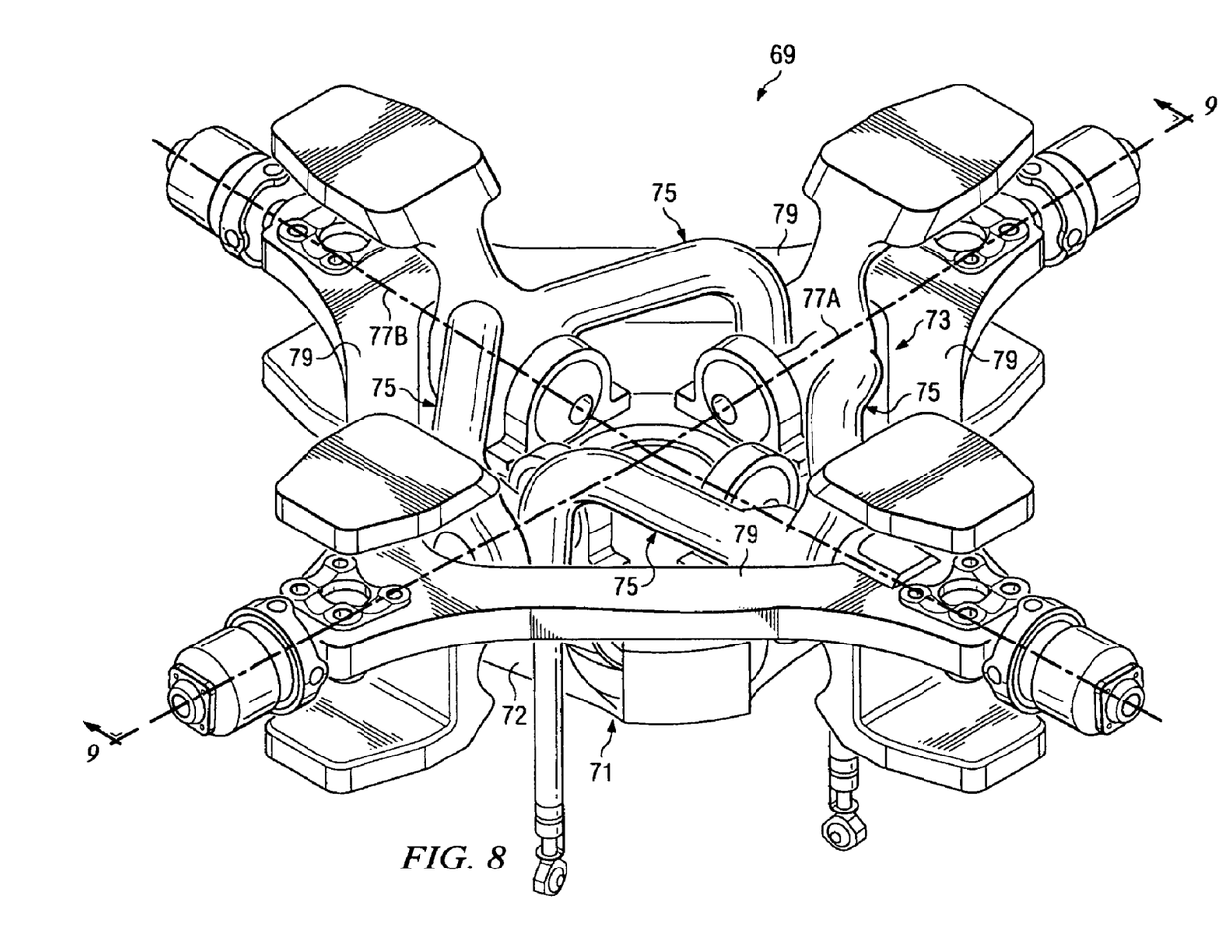
FIG. 8 is a partial perspective view of a rotor-hub having a connecting shell located below the yoke according to an alternate embodiment of the present invention.
Figure 9:
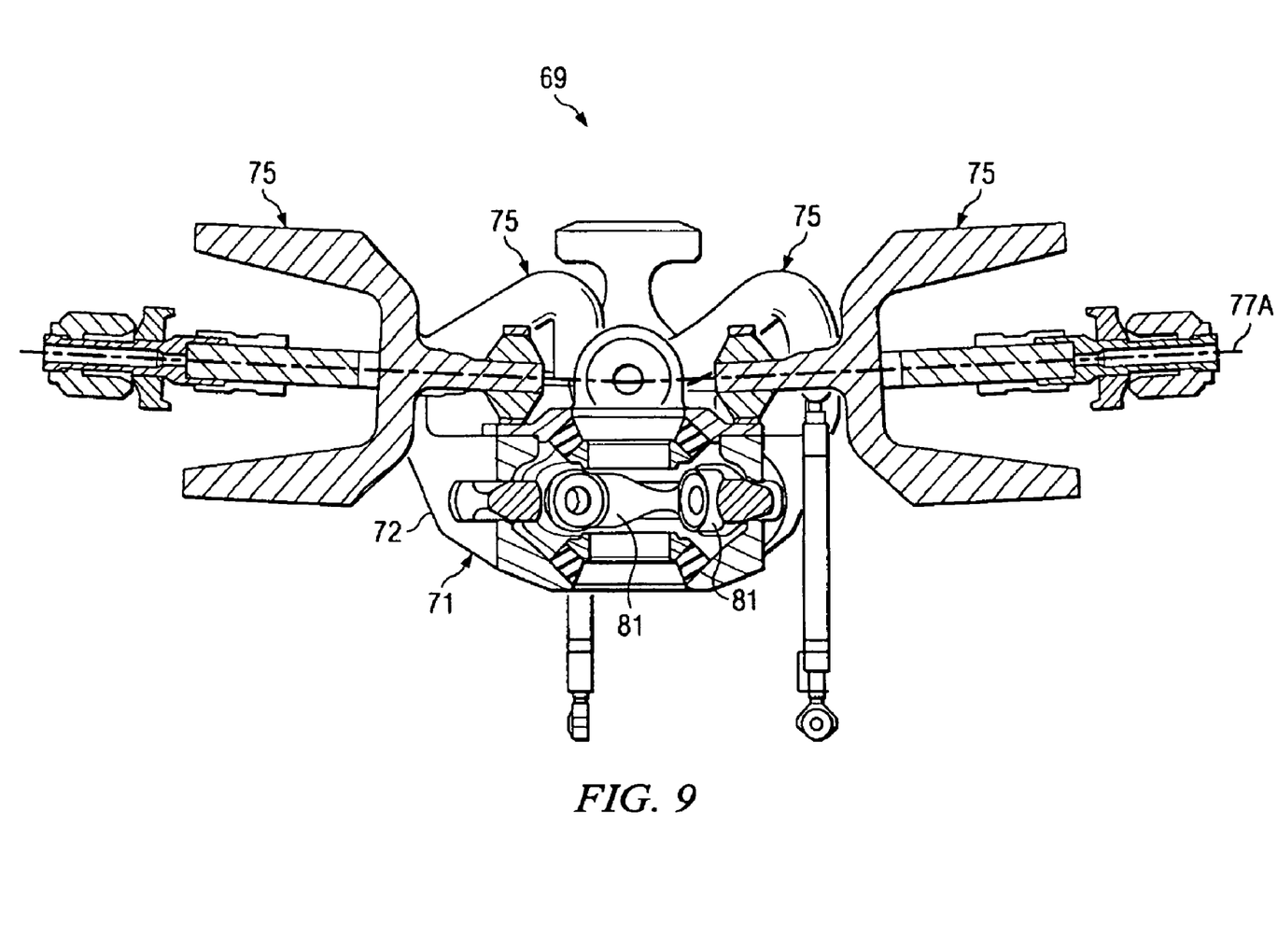
FIG. 9 is a cross-sectional view of the rotor-hub of FIG. 8 taken along the line 9-9 in FIG. 8.

Referring now to FIGS. 8-9 in the drawings, a rotor-hub embodiment according to the present invention also incorporates a hub-spring 71 similar to hub-spring 45. However, connecting shell 72 of hub-spring 45 is located below a yoke 73. As illustrated in FIG. 8, rotor-hub 69 is substantially similar to rotor-hub 29 and comprises substantially similar components with three main differences: (1) connecting shell 72 is located on the underside of yoke 73 rather than on the upper side of yoke 73; (2) pitch horns 75 are curved, rod-like structures, portions of which are located slightly above the plane created by pitch change axes 77A, 77B but still within a central void space defined by the inner walls 32 of yoke 73; and (3) drive links 81 are illustrated as being located slightly below the plane created by pitch change axes 77A, 77B but still substantially within central void column. It will be appreciated that rotor-hub 69 may alternatively comprise pitch horns 53 which would lie substantially within the plane created by pitch change axes 77A, 77B. Similar to the embodiment of FIGS. 3-7, hub-spring 71 allows gimbaling of yoke 73 with respect to the mast and mast rotation axis 39 (shown in FIG. 3A). Hub-spring 71 also accommodates flapping of rotor-blades 23 (shown in FIG. 2) and transfers thrust.

Figure 10:
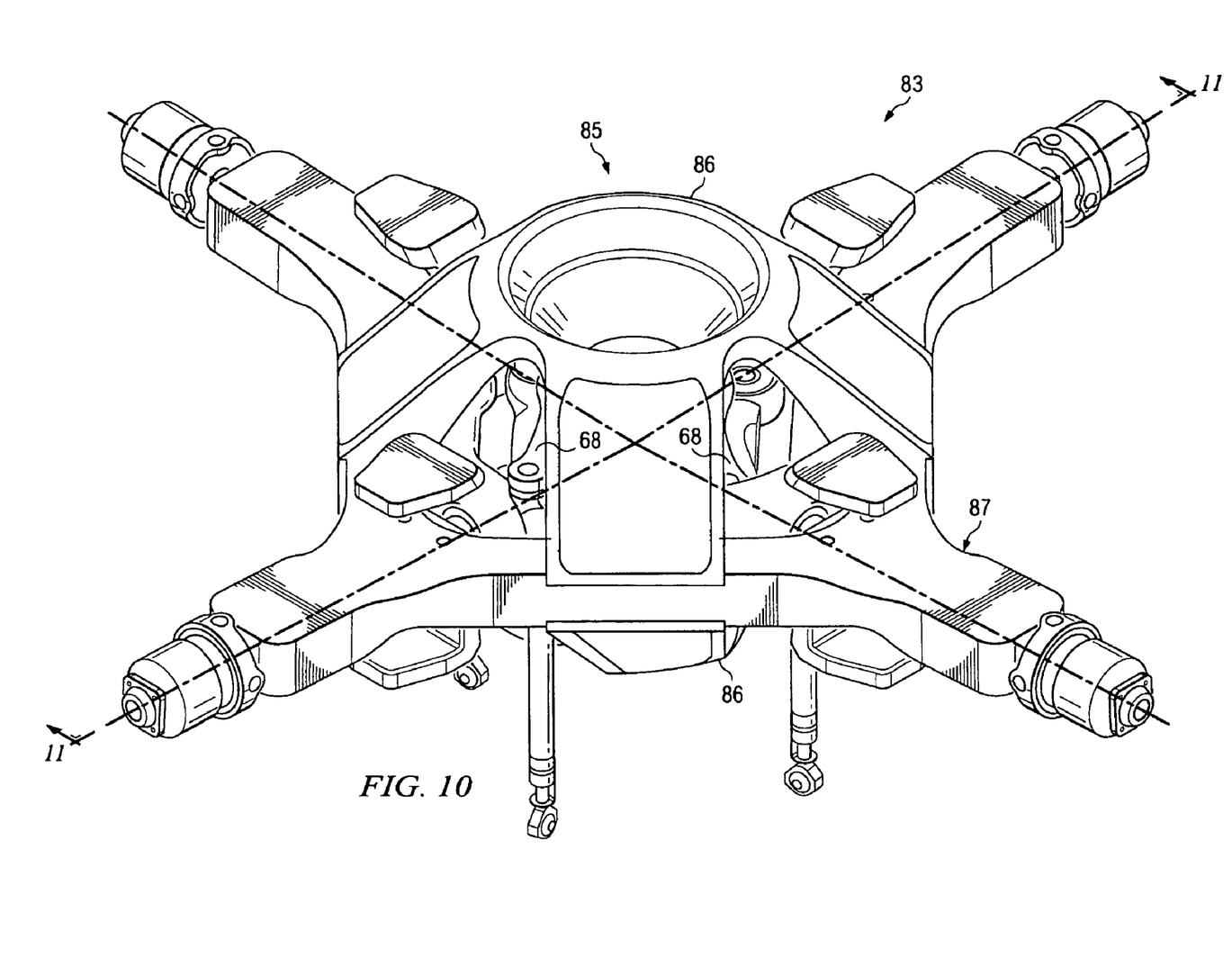
FIG. 10 is a perspective view of a rotor-hub having two connecting shells according to an alternate embodiment of the present invention.
Figure 11:
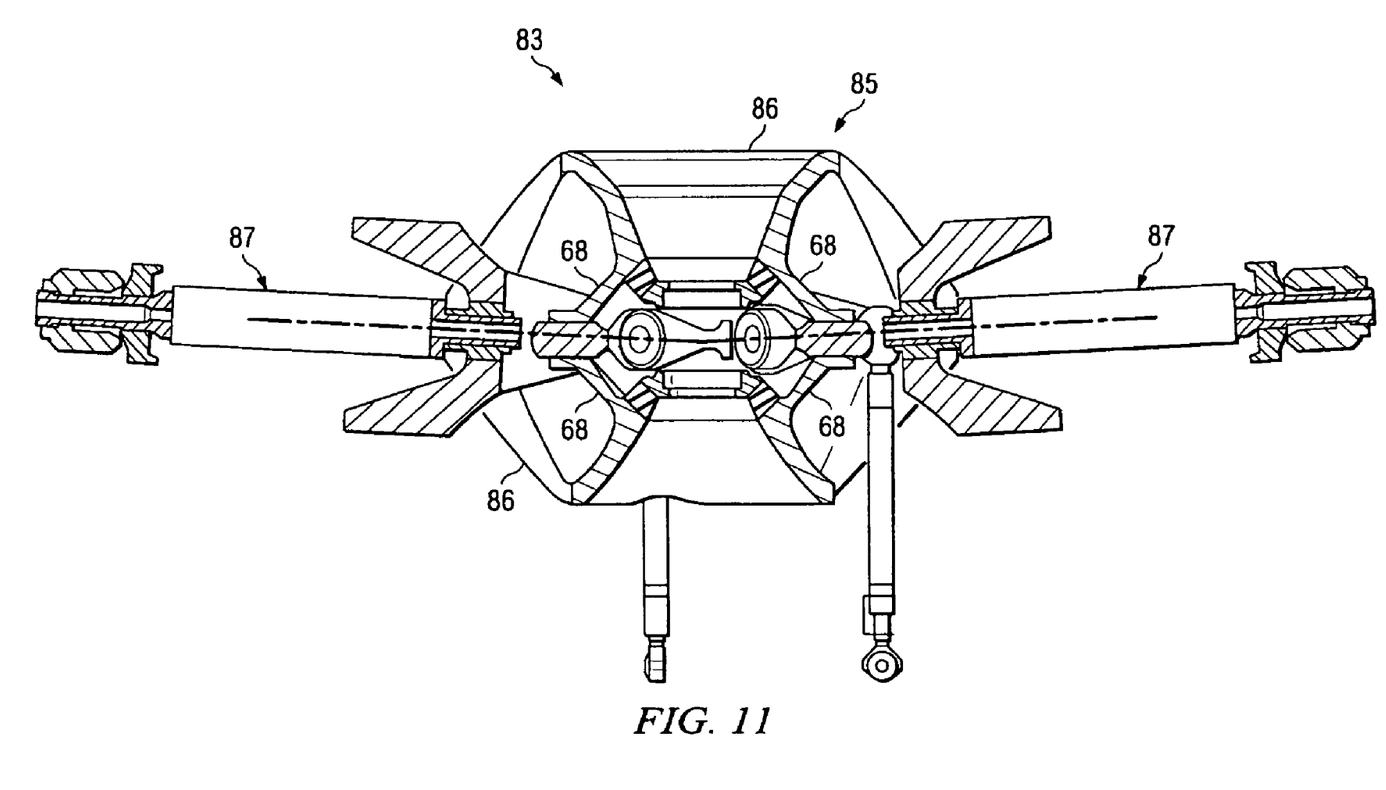
FIG. 11 is a cross-sectional view of the rotor-hub of FIG. 10 taken along the line 11-11 in FIG. 10.

Referring now to FIGS. 10-11 in the drawings, a rotor-hub embodiment according to the present invention having a hub-spring 85 comprising two connecting shells 86 is illustrated. As illustrated in FIG. 10, rotor-hub 83 is substantially similar to rotor-hub 29 and comprises substantially similar components except that two connecting shells 86 are present within rotor-hub 83. One connecting shell 86 is mounted on the underside of yoke 87 while another connecting shell 86 is mounted on the upper side of yoke 87. One important advantage of rotor-hub 83 is connecting shell 86 redundancy. For example, if one of connecting shells 86 is damaged by a ballistic round or fail for any other reason, the remaining connecting shell 86 can continue to function normally. Another important advantage of an embodiment having two connecting shells 86 is the resulting improved distribution of forces being transferred from hub-springs 85 to yoke 87. Similar to the embodiment of FIGS. 3-7, hub-springs 85 allows gimbaling of yoke 87 with respect to the mast and mast rotation axis 39 (shown in FIG. 3A). Hub-springs 85 also accommodate flapping of rotor-blades 23 (shown in FIG. 2) and transfers thrust.

An important advantage of the present invention is that, while providing for use of four or more rotor-blades per rotor-hub, the majority of components are compactly packaged substantially within an interior void space between the yoke straps. This arrangement makes the rotor-hubs of the present invention a tougher target for enemy combatants and a less likely target for unintentional debris. Further, the present invention allows for several variations in pitch horn travel. For example, where a connecting shell is only located on the top of a yoke, more space is available for downward pitch horn travel. Similarly, where a connecting shell is only located on the underside of a yoke more space is available for upward pitch horn travel. Also, where connecting shells are located both on the top and underside of a yoke, pitch horn travel may be more evenly divided between upward travel and downward travel. Finally, for each of the embodiments described above, a CF bearing failure would generally not result in losing a rotor-blade. Rather, the pitch horn associated with the failed CF bearing would be drawn toward the associated crotch of the yoke, such that, at least temporarily, safe operation of the aircraft could occur.

It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A rotor hub for a rotary wing aircraft, comprising:
   a yoke having a plurality of yoke arms, adjacent yoke arms being joined together by a yoke strap, the yoke arms and the yoke straps defining a central void space, the void space being adapted to receive a central shaft therethrough;
   at least one pitch horn having a pitch horn inboard beam and a pitch horn arm, wherein the pitch horn is pivotally connected to the yoke and the pitch horn inboard beam is substantially disposed within the central void space;
   a constant velocity joint adapted to transfer force from the central shaft to the yoke and wherein the constant velocity joint is substantially disposed within a central void space, the constant velocity joint having a plurality of drive links coupled to the central shaft; and
   a hub spring having an upper outer shell being resiliently connected to an inner shell with an inner core, the upper outer shell being coupled to the plurality of drive links, wherein the hub spring is configured to transfer rotational forces from the central shaft, via the plurality of drive links, through the upper outer shell, to the yoke;
   wherein the upper outer shell is coupled to an upper surface of the yoke, thereby permitting a pitch link to be coupled to the pitch horn within the central void space.

2. The rotor hub according to claim 1, wherein the yoke is constructed of discrete layers of directional fiber material.

3. The rotor hub according to claim 1, the hub spring further comprising:
   a lower outer shell also resiliently connected to the inner shell with the inner core, wherein the lower outer shell is disposed within the central void column.

4. The rotor hub according to claim 3, wherein the pitch links are located outboard of the lower outer shell and within the central void column.

5. The rotor hub according to claim 1, wherein the pitch horns are configured to produce a $\delta_3$ angle of about −15 degrees.

6. The rotor hub according to claim 1, wherein the yoke is configured to accommodate at least four rotor blades.

7. The rotor hub according to claim 1, wherein the rotor hub is configured for use with a tiltrotor aircraft.

8. A rotor hub for a rotary wing aircraft, comprising:
   a yoke having at least four yoke arms, each pair of adjacent yoke arms being joined together by a yoke strap, the yoke arms and the yoke straps defining a central void space, the central void space being adapted to receive a central shaft therethrough;
   a pitch horn having a pitch horn inboard beam and a pitch horn arm, wherein the pitch horn is pivotally connected to the yoke and the pitch horn inboard beam is substantially disposed within the central void space;

a homokinetic joint adapted to transfer force from the central shaft to the yoke, the homokinetic joint being substantially disposed within the central void space, the homokinetic joint having a plurality of drive links coupled to the central shaft; and a hub spring having an upper outer shell being resiliently connected to an inner shell with an inner core, the upper outer shell being coupled to the plurality of drive links, wherein the hub spring is configured to transfer rotational forces from the central shaft, via the plurality of drive links, through the upper outer shell, to the yoke;

wherein the upper outer shell is coupled to an upper surface of the yoke, thereby permitting a pitch link to be coupled to the pitch horn within the central void space.

wherein the pitch horns are configured to produce a $\delta_3$ angle of about −15 degrees.

9. The rotor hub according to claim 8, wherein the yoke is formed from a composite material constructed of discrete layers of directional fibers.

10. The rotor hub according to claim 8, the homokinetic joint further comprising:

a lower outer shell also resiliently connected to the inner shell with the inner core, wherein the lower outer shell is disposed within the central void column.

* * * * *